Sept. 24, 1940.  C. R. BUCHET  2,215,686
BEARING SEAL
Filed Nov. 7, 1938
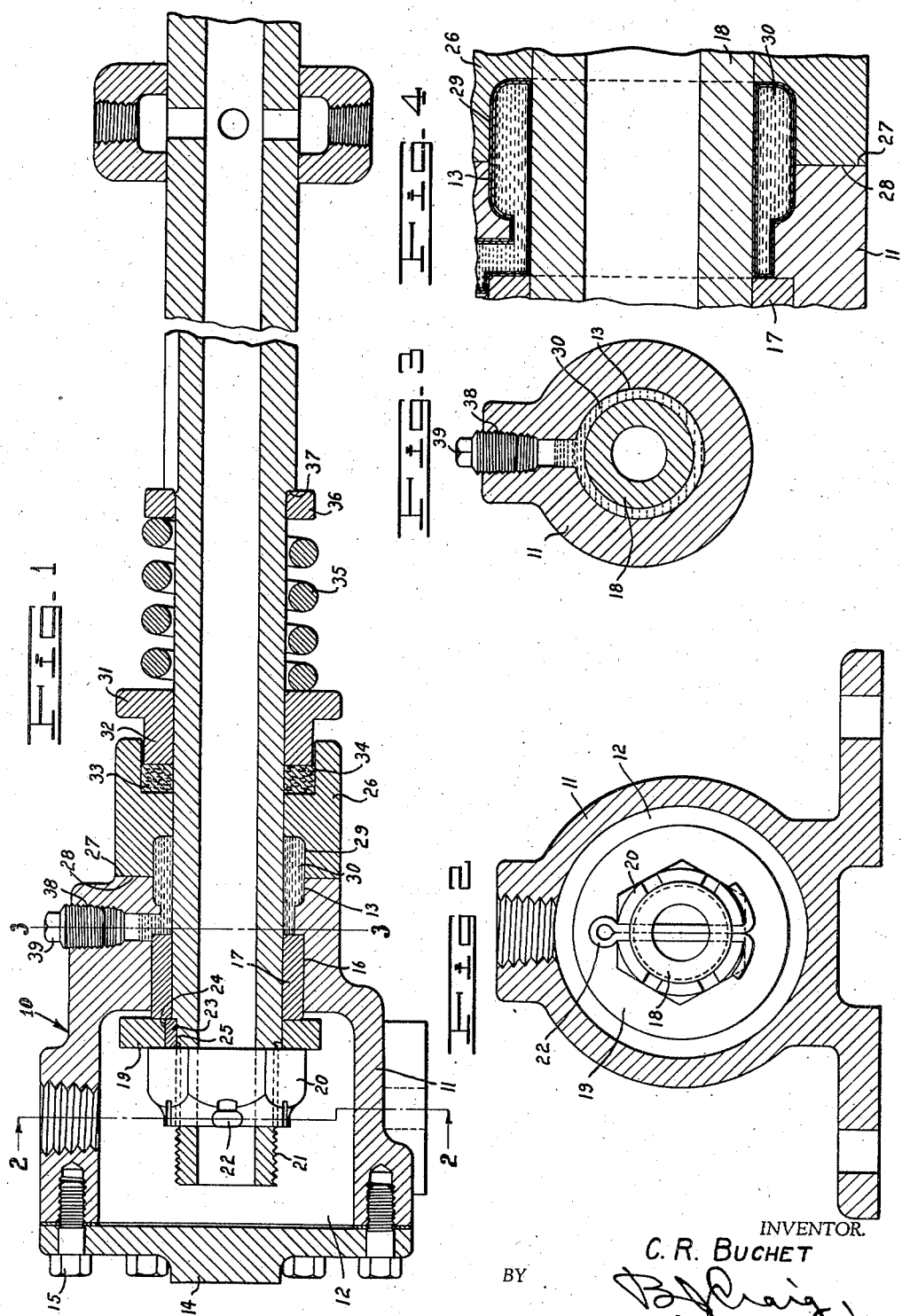
INVENTOR.
C. R. BUCHET
BY
ATTORNEY.

Patented Sept. 24, 1940

2,215,686

UNITED STATES PATENT OFFICE 2,215,686

BEARING SEAL

Conrad R. Buchet, Pasadena, Calif., assignor of one-half to Theodore E. Herlihy, Pasadena, Calif.

Application November 7, 1938, Serial No. 239,285

8 Claims. (Cl. 308—36.3)

This invention relates to bearing seals.

The general object of my invention is to provide a novel fluid tight seal for a rotating or reciprocating shaft.

A more specific object of the invention is to provide a seal which is particularly adapted for sealing bearings wherein a solid or hollow rotating shaft conveys liquid or gas which is of such a nature that it must be prevented from escaping from the bearing and the shaft.

Another object of the invention is to provide a seal for a shaft including a housing having a chamber and wherein the shaft is surrounded by material confined in the chamber and which has an affinity for material on the shaft and for the material forming the walls of the confining chamber.

Another object of the invention is to provide a novel mercury seal for shafts.

A further object of the invention is to provide an improved shaft bearing.

Other objects and the advantages of the invention will be apparent from the following description taken in connection with the accompanying drawing, wherein:

Fig. 1 is a central sectional view through a bearing embodying the features of my invention;

Fig. 2 is a section taken on line 2—2, Fig. 1;

Fig. 3 is a section taken on line 3—3, Fig. 1; and

Fig. 4 is an enlarged, fragmentary detail showing the sealing chamber.

Referring to the drawing by reference characters I have shown my invention as embodied in a seal which is indicated generally at 10. This seal is particularly adapted for use with liquids and gases and may be used (although it is not limited exclusively for such use) in connection with refrigeration or air conditioning systems wherein methyl chloride, sulphur dioxide, and other materials are used.

The seal includes a metallic housing 11 which has an enlarged chamber 12 at one end and a reduced chamber 13 at the other end. The outer end of the large chamber is closed by a cap 14 which may be held in place by cap screws 15.

The reduced portion 13 of the chamber includes an internal rabbeted portion 16 in which a cast iron bearing 17 is mounted. This cast iron bearing 17 receives a hollow tubular steel shaft 18 which is engaged by a washer 19 held in place by a nut 20 mounted on the threaded end 21 of the hollow shaft and held against rotation by a cotter pin 22 which passes through the shaft. A key 23 engages in grooves 24 and 25 in the washer and shaft to prevent relative rotation.

About the shaft 18 I provide a steel ring 26 which has a ground end 27 which engages a similar ground end 28 on the housing 11. The ring 26 rotates with the shaft and is recessed as at 29. The recess 29 with the outer end of the chamber 13 provides a receptacle 30 which extends along the shaft to the bearing 17.

A sliding collar 31 is mounted on the shaft 18 and includes an annular portion 32 which fits within a recess 33 on the ring 26.

Suitable packing 34 is engaged by the annular portion 32 and to prevent leakage along the shaft is urged into tight packing position by a coiled spring 35 which engages a collar 36 held against a shoulder 37 on the shaft. The construction is such that when the nut 20 is tightened it pulls the spring against the collar 31 thus packing the joint.

The walls defining the receptacle 30 and the shaft 18 within the receptacle are preferably silver plated on copper so that the receptacle interior has a silver surface. The housing includes a threaded aperture 38 which communicates with the receptacle 30 and through this aperture I pour mercury to which I may add a few drops of oil. The mercury is supplied until the receptacle 30 is filled and a head extends into the aperture 38. A tapered threaded plug 39 serves to keep the mercury in place.

I may employ liquid mercury alone, although when the pressure of the fluid passing through the shaft is heavy I may increase the viscosity of the mercury by adding block tin thereto in suitable amounts. I may use other material than tin so long as it is soluble in mercury and modifies the viscosity of the mercury. I also find that a few drops of lubricating oil added to the mercury is beneficial in that it is carried about by the shifting of the mercury and thus lubricates the parts with which it comes in contact.

With my construction the mercury is amalgamated to the shaft and to the walls of the receptacle so that a metal to metal seal which is fully hermetic is secured.

The viscosity and surface tension of the mercury or the mercury alloy aids in securing the tight seal while the slight head on the mercury is sufficient to cause the mercury to completely fill the chamber about the shaft.

Having thus described my invention I claim:

1. In a bearing, a housing, a shaft rotatable in said housing, said housing including a chamber about said shaft, the inner wall of said chamber having a silver plating thereon, and a filling including liquid mercury in said chamber.

2. In a bearing, a housing, a shaft rotatable in said housing, said housing including a chamber about said shaft, the inner wall of said chamber having a plating thereon, and a filling in said chamber, said filling comprising mercury and a metal amalgamated with the mercury.

3. In a bearing, a housing, a shaft rotatable in said housing, said housing including a chamber about said shaft, the inner wall of said chamber having a silver plating thereon, and a filling of mercury and oil in said chamber.

4. In a bearing, a housing having a bearing therein, a shaft in said bearing, a ring engaging said shaft, said ring having an end engaging said housing, packing means engaging said ring and said shaft, said ring and the housing having a chamber therein, one end of said bearing forming one end of said chamber, the inner wall of said chamber having a silver plating thereon, and a filling of mercury engaging said plated portion.

5. In a bearing, a housing having a bearing ring therein, a shaft in said bearing ring, a second ring engaging said shaft, said second ring having a ground end engaging a ground end on said housing, packing means engaging said second ring and said shaft, said second ring and the other end of the housing having a second chamber therein, one end of said bearing ring forming one end of said second chamber, said second chamber having a silver plating thereon, and a filling of mercury engaging said plated portion.

6. In a bearing, a housing having an enlarged chamber at one end and a reduced chamber at the other end, said reduced chamber including a shoulder, a bearing ring engaging said shoulder, a shaft in said bearing ring, a second ring engaging said shaft, said second ring having a ground end engaging a ground end on said housing, said second ring having a recess therein, packing in said recess, means on said shaft engaging said packing, said second ring having a chamber therein communicating with the reduced chamber in the housing, said housing including an aperture to said reduced chamber, a closure for said aperture, the inner wall of said reduced chamber, the end of said bearing in said chamber, the chamber in said second ring and the shaft having a silver plating thereon, and a filling of mercury engaging said plated portions.

7. In a bearing, a housing having a chamber at one end, a bearing ring in said housing, a shaft in said bearing ring, a second ring engaging said shaft, said second ring having a ground end engaging a ground end on said housing, packing means engaging said ring and said shaft, said second ring and the other end of the shaft having a second chamber therein, one end of said bearing ring forming one end of said second chamber, said housing including an aperture to said second chamber, a closure for said aperture, the inner wall of said second chamber having a silver plating thereon, and a filling of mercury engaging said plated portion.

8. In a bearing, a housing having an enlarged chamber at one end and a reduced chamber at the other end, said reduced chamber including a shoulder, a bearing ring engaging said shoulder, a shaft in said bearing ring, a second ring engaging said shaft, said second ring having a ground end engaging a ground end on said housing, a sliding collar on said shaft, said second ring having a recess therein, packing in said recess, said collar including a portion engaging said packing, a shoulder on said shaft remote from said collar, a collar engaging said last mentioned shoulder, a spring between said collars, means on said shaft within said enlarged chamber tending to urge said second collar towards said first collar, said second ring having a chamber therein communicating with the reduced chamber in the housing, said housing including an aperture to said reduced chamber, a closure for said aperture, the inner wall of said reduced chamber, the end of said bearing in said chamber, the chamber in said second ring and the shaft having a silver plating thereon, and a filling of mercury engaging said plated portions.

CONRAD R. BUCHET.